United States Patent
Juang et al.

(10) Patent No.: US 10,598,512 B2
(45) Date of Patent: Mar. 24, 2020

(54) BATTERYLESS ROTARY ENCODER

(71) Applicant: INDUSTRIAL TECHNOLOGY RESEARCH INSTITUTE, Hsin-Chu (TW)

(72) Inventors: Kai-Cheung Juang, Hsinchu (TW); Yuan-Tai Chang, New Taipei (TW)

(73) Assignee: INDUSTRIAL TECHNOLOGY RESEARCH INSTITUTE, Hsin-Chu (TW)

( * ) Notice: Subject to any disclaimer, the term of this patent is extended or adjusted under 35 U.S.C. 154(b) by 127 days.

(21) Appl. No.: 15/891,554

(22) Filed: Feb. 8, 2018

(65) Prior Publication Data

US 2019/0128697 A1    May 2, 2019

(30) Foreign Application Priority Data

Oct. 26, 2017 (TW) .............................. 106136971 A (51) Int. Cl.
*G01B 7/30* (2006.01)
*G01D 5/14* (2006.01)
(Continued)

(52) U.S. Cl.
CPC .............. *G01D 5/142* (2013.01); *G01D 5/12* (2013.01); *G01D 5/14* (2013.01); *G01D 5/145* (2013.01);
(Continued)

(58) Field of Classification Search
CPC ............ G01D 5/145; G01D 5/14; G01D 5/12; G01D 11/245; G01B 7/30; G01B 7/003; G01B 7/14; G01B 11/026
(Continued)

(56) References Cited

U.S. PATENT DOCUMENTS 3,820,090 A    6/1974 Wiegand
4,364,013 A    12/1982 Castera et al.
(Continued)

FOREIGN PATENT DOCUMENTS

CN    101330257 A    12/2008
CN    102117089 A    7/2011
(Continued)

OTHER PUBLICATIONS

CN 203848849 Machine Translation, Sep. 24, 2014 (Year: 2014).*
(Continued)

*Primary Examiner* — Raul J Rios Russo
(74) *Attorney, Agent, or Firm* — Locke Lord LLP; Tim Tingkang Xia, Esq.

(57) ABSTRACT

A batteryless rotary encoder is provided, which includes a rotation detecting section and a signal processing section. The rotation detecting section includes a rotational exciter magnet and a piezoelectric transducer. The piezoelectric transducer is constructed by laminating a magnetic material and a piezoelectric transduction sheet, and the magnetic material faces toward the rotational exciter magnet. When the rotational exciter magnet rotates, the rotational exciter magnet attracts or repels the magnet sheet or the magnetic metal sheet so that the piezoelectric transducer is pressed or stretched by the magnet sheet or the magnetic metal sheet to generate a first output signal. The signal processing section includes a counter and a rectifier. The counter receives the first output signal and calculates revolutions of the first output signal to indicate the number of rotations of the rotational exciter magnet. The rectifier receives the first output signal to power the counter.

12 Claims, 6 Drawing Sheets

(51) Int. Cl.

| | |
|---|---|
| *G01D 5/347* | (2006.01) |
| *G01D 5/245* | (2006.01) |
| *G01P 3/487* | (2006.01) |
| *G01D 5/12* | (2006.01) |
| *G01D 11/24* | (2006.01) |
| *B23Q 17/22* | (2006.01) |
| *H04R 17/00* | (2006.01) |
| *G01B 7/00* | (2006.01) |
| *G01B 11/02* | (2006.01) |

(52) U.S. Cl.
CPC ......... *G01D 5/2451* (2013.01); *G01D 5/3473* (2013.01); *G01D 11/245* (2013.01); *G01P 3/487* (2013.01); *B23Q 17/22* (2013.01); *G01B 7/003* (2013.01); *G01B 7/30* (2013.01); *G01B 11/026* (2013.01); *H04R 17/00* (2013.01)

(58) Field of Classification Search
USPC .......... 324/51, 55, 178, 200, 207.11, 207.25, 324/341
See application file for complete search history.

(56) References Cited

U.S. PATENT DOCUMENTS

| | | | |
|---|---|---|---|
| 5,148,243 A | | 9/1992 | Merrick et al. |
| 5,751,009 A | | 5/1998 | Anderson et al. |
| 6,191,687 B1 | | 2/2001 | Dlugos et al. |
| 7,256,532 B2 | | 8/2007 | Viehland et al. |
| 7,586,283 B2 | | 9/2009 | Kabashima et al. |
| 7,598,733 B2 | | 10/2009 | Mehnert et al. |
| 7,679,346 B2 | | 3/2010 | Lin et al. |
| 7,920,010 B2 | | 4/2011 | Chen, Jr. et al. |
| 8,018,210 B2 | | 9/2011 | Chen et al. |
| 8,064,872 B2 | | 11/2011 | Dupuis |
| 8,076,793 B2 | | 12/2011 | Robbins |
| 8,169,108 B2 | | 5/2012 | Dupuis et al. |
| 8,305,066 B2 | | 11/2012 | Lin et al. |
| 8,344,919 B2 | | 1/2013 | Tseng |
| 8,385,043 B2 | | 2/2013 | Ng et al. |
| 8,451,032 B2 | | 5/2013 | Dong et al. |
| 8,526,013 B2 | | 9/2013 | Makiuchi et al. |
| 8,592,944 B2 | | 11/2013 | Santangelo et al. |
| 8,878,125 B2 | | 11/2014 | Miyajima et al. |
| 8,878,591 B2 | | 11/2014 | Fang et al. |
| 8,971,065 B2 | | 3/2015 | Juang et al. |
| 9,182,426 B2 | | 11/2015 | Tsai et al. |
| 9,257,896 B1 | | 2/2016 | Shin et al. |
| 2006/0028751 A1* | | 2/2006 | Takeuchi ............. G02B 7/1821 |
| 2010/0052663 A1* | | 3/2010 | Mehnert ............ G01D 5/24428 324/207.25 |
| 2011/0187357 A1 | | 8/2011 | Steinich et al. |
| 2013/0241309 A1* | | 9/2013 | Arnold .................. H02K 99/10 307/104 |
| 2014/0035438 A1 | | 2/2014 | Livermore-Clifford et al. |
| 2015/0015245 A1 | | 1/2015 | Inoue et al. |
| 2015/0041190 A1 | | 2/2015 | Bonifield et al. |
| 2016/0010619 A1* | | 1/2016 | Phillips .................. F03B 13/16 290/53 |
| 2017/0155287 A1* | | 6/2017 | Arnold .................... H02J 50/50 |

FOREIGN PATENT DOCUMENTS

| | | |
|---|---|---|
| CN | 102487281 A | 6/2012 |
| CN | 102692243 A | 9/2012 |
| CN | 102916602 A | 2/2013 |
| CN | 103197250 A | 7/2013 |
| CN | 103219754 A | 7/2013 |
| CN | 103219867 A | 7/2013 |
| CN | 103982541 A | 8/2014 |
| CN | 203848849 U | 9/2014 |
| TW | I325100 B | 5/2010 |
| TW | I354193 B | 12/2011 |
| TW | I384764 B | 2/2013 |
| TW | I395083 B | 5/2013 |
| TW | 201344159 A | 11/2013 |
| TW | I451095 B | 9/2014 |
| TW | I462429 B | 11/2014 |
| TW | I465750 B | 12/2014 |
| TW | I466407 B | 12/2014 |
| TW | 201507340 A | 2/2015 |
| TW | I476415 B | 3/2015 |
| TW | I487264 B | 6/2015 |
| TW | I539763 B | 6/2016 |
| TW | I568122 B | 1/2017 |
| TW | I569556 B | 2/2017 |
| TW | I582447 B | 5/2017 |
| TW | I595518 B | 8/2017 |
| TW | I600286 B | 9/2017 |

OTHER PUBLICATIONS

CN 103982541 Machine Translation, Aug. 13, 2014 (Year: 2014).*
Intellectual Property Office Ministry of Economic Affairs, R.O.C., Office Action, dated Apr. 23, 2018, Taiwan.
Battery-less Absolute Encoder Built-in to RCP5-IAI America, 2017.
Fredrik Häggström et al., Energy harvesting technologies for wireless sensors in rotating environments, IEEE Emerging Technology and Factory Automation (ETFA), 2014.
IC-PMX, iC-Haus, 2014.
D.T. Huong Giang et al., Magnetoelectric sensor for microtesla magnetic-fields based on (Fe80Co20)78Si12B10/PZT laminates. Sensors and Actuators A: Physical, 2009, 149, pp. 229-232.
Olivier Geoffroy et al., Practical and theoretical investigations of a rotating coilless actuator using the inverse magnetostrictive effect, IEEE Transactions on Magnetics, 2010, vol. 46, No. 2.
ROBO Cylinder with Battery-less Absolute Encoder as Standard, RCP6_CE0238-1A_A4s_080916.
MABA-010112-CT1A40, MA-COM Technology Solutions, 2002.

* cited by examiner

BATTERYLESS ROTARY ENCODER

CROSS REFERENCE TO RELATED APPLICATIONS

This application claims the benefit of Taiwan Application No. 106136971, filed on Oct. 26, 2017, hereby incorporated by reference in its entirety.

TECHNICAL FIELD

The technical field relates a batteryless rotary encoder.

BACKGROUND

In industrial applications, one of the most important production tools is the machine tools, such as mechanical arms, wire bonding machines, computer numerical control (CNC) lathes etc. Positioning is the most important work of the machine tools, which is usually performed by the encoder. When the power is off, the machine cannot interpret the location changing information. When the power is restored, the machine tools performs home-return calibration using the encoder to retrieve the origin of the location.

Conventional encoders usually use a backup battery. When the power system supplies power normally, the encoder is powered by the power system. When power is off, the encoder is powered by the backup battery. However, it increases production costs because that backup batteries need to be replaced regularly.

SUMMARY

A batteryless rotary encoder is provided according to an embodiment of the disclosure. The batteryless rotary encoder included a rotation detecting section and a signal processing section. The rotation detecting section includes a rotational exciter magnet and a piezoelectric transducer. The piezoelectric transducer is constructed by laminating a magnetic material and a piezoelectric transduction sheet, and the magnetic material faces toward the rotational exciter magnet. When the rotational exciter magnet rotates, the rotational exciter magnet attracts or repels the magnet sheet or the magnetic metal sheet so that the piezoelectric transducer is pressed or stretched by the magnet sheet or the magnetic metal sheet to generate a first output signal. The signal processing section includes a counter and a rectifier. The counter receives the first output signal and calculates the number of pulses of the first output signal to indicate the number of rotations of the rotational exciter magnet. The rectifier receives the first output signal and generates the power for the counter.

To achieve these and other advantages and in accordance with the objective of the invention, as embodied and broadly described herein, the present invention is configured as follows.

BRIEF DESCRIPTION OF THE DRAWINGS

For a more complete understanding of the embodiments, and the advantages thereof, reference is now made to the following descriptions taken in conjunction with the accompanying drawings.

DETAIL DESCRIPTION

According to the embodiments of the disclosure, a batteryless rotary encoder is provided for replacing rotary encoders using backup battery by capturing magnetic energy.

Figure 1A:
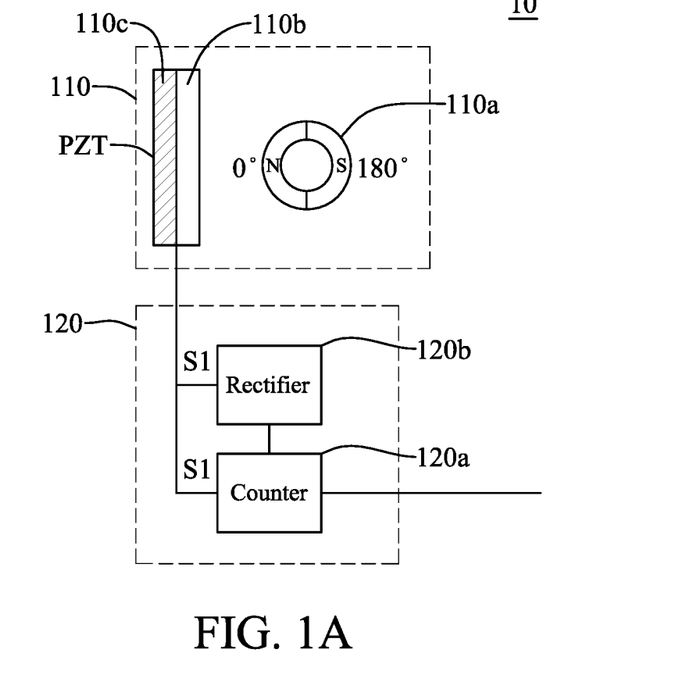
FIG. 1A is a schematic diagram of a batteryless rotary encoder in accordance with a first embodiment of the disclosure.

Referring to FIG. 1A, a batteryless rotary encoder 10 is provided in accordance with a first embodiment of the disclosure. The batteryless rotary encoder 10 includes a rotation detecting section 110 and a signal processing section 120. The rotation detecting section 110 includes a rotational exciter magnet 110a and a piezoelectric transducer (PZT). The PZT is constructed by laminating a magnetic material 110b and a piezoelectric transduction sheet 110c. The magnet material 110b faces toward the rotational exciter magnet 110a, in which the rotational exciter magnet 110a attracts or repels the magnet material 110b so that the PZT is pressed or stretched by the magnet material 110b to generate a first output signal S1 when the rotational exciter magnet 110a rotates.

Figure 1B:
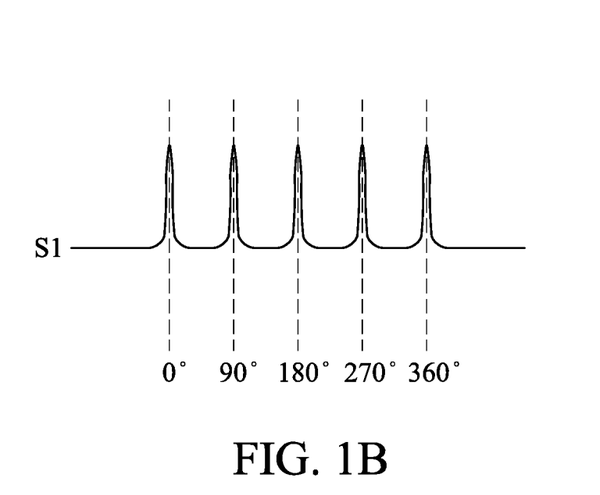
FIG. 1B shows a first output signal generated by a piezoelectric transducer in accordance with first embodiment of the disclosure.

The signal processing section 120 includes a counter 120a and a rectifier 120b. Referring to FIG. 1B, the counter 120a receives the first output signal S1 and calculates the number of pulses of the first output signal S1 to indicate revolutions of the rotational exciter magnet 110a. Referring to FIG. 1B, the rotational exciter magnet 110a rotates one turn when the counter 120a counts three pulses.

The rectifier 120b receives the first output signal S1 and generates the power for the counter 120a.

Figure 2A:
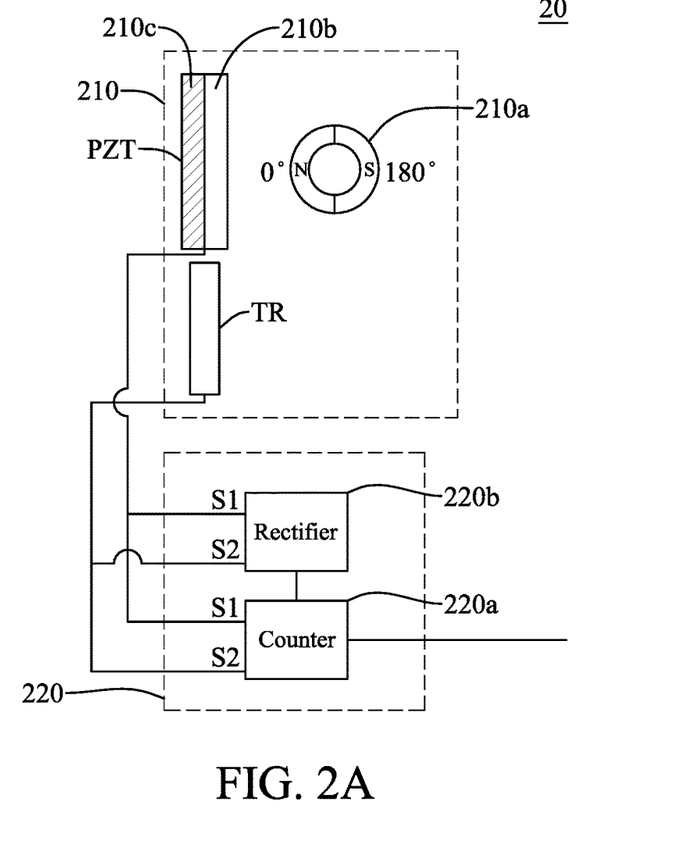
FIG. 2A a schematic diagram of a batteryless rotary encoder in accordance with a second embodiment of the disclosure.

Referring to FIG. 2A, a batteryless rotary encoder 20 is provided in accordance with a second embodiment of the disclosure, in which the second embodiment differs from the first embodiment in that the rotation detecting section 210 further includes a transducer (TR). The TR is implemented on a side the same with to the PZT and generates a second output signal S2. The rotation detecting section 210 includes a rotational exciter magnet 210a, a PZT and the TR. The PZT is constructed by laminating a magnetic material 210b and a piezoelectric transduction sheet 210c. In signal processing section 220, the rectifier 220b receives the first output signal S1 and generates the power for the counter 220a. The counter 220a receives the second output signal S2 to indicate that rotational exciter magnet rotates 210a clockwise or counterclockwise according to order of occurrence of the first output signal S1 and the second output signal S2.

Figure 2B:
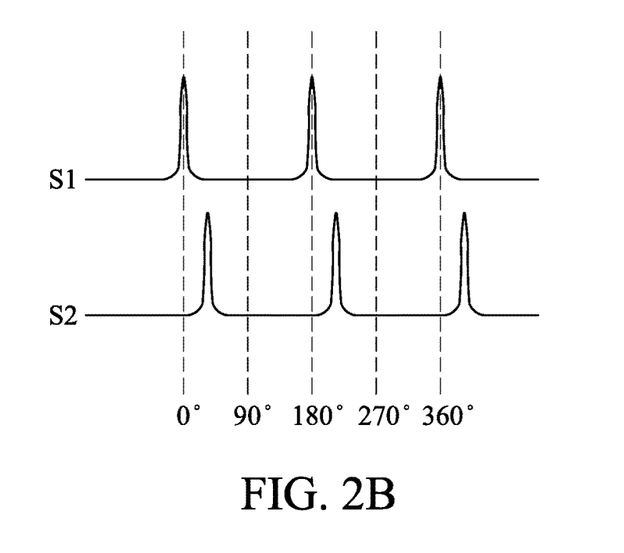
FIG. 2B shows a first output signal and a second output signal respectively generated by the piezoelectric transducer and a transducer in accordance with the second embodiment of the disclosure.

Referring to FIG. 2B, the second output signal S2 generated by the TR falls behind the first signal S1 generated by the PZT when the rotational exciter magnet 210a rotates counterclockwise; otherwise, the second output signal S2 generated by the TR leads the first signal S1 generated by the PZT when the rotational exciter magnet 210a rotates clockwise, thereby indicating the rotational exciter magnet 210a rotates clockwise or counterclockwise.

In the second embodiment, the TR is another piezoelectric transducer or a magnetic sensor. The magnetic sensor is a Hall-effect transducer, a magneto resistive-type sensor or a coil-type sensor.

Figure 3A:
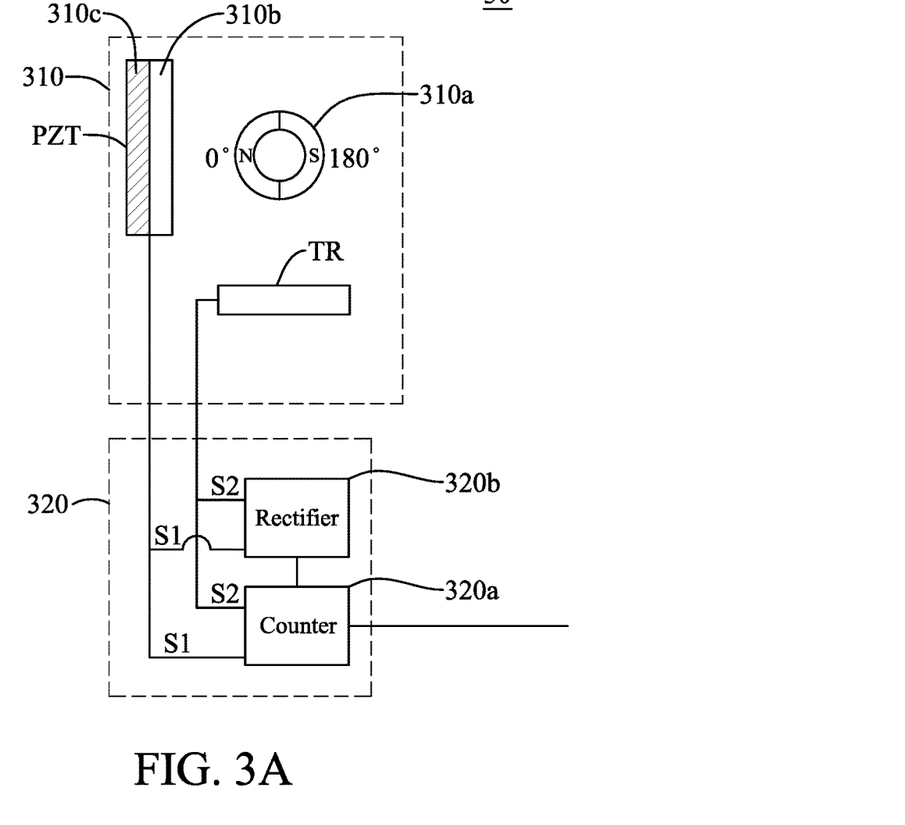
FIG. 3A is a schematic diagram of a batteryless rotary encoder in accordance with a third embodiment of the disclosure.

Referring to FIG. 3A, a batteryless rotary encoder 30 is provided in accordance with a third embodiment of the disclosure, in which the third embodiment differs from the first embodiment in that the rotation detecting section 310 further includes a transducer (TR). The TR is implemented on a side perpendicular to the PZT and generates a second output signal S2. The rotation detecting section 310 includes a rotational exciter magnet 310a, a PZT and the TR. The PZT is constructed by laminating a magnetic material 310b and a piezoelectric transduction sheet 310c. In signal processing section 320, the rectifier 320b receives the first output signal S1 and generates the power for the counter 320a. The counter 320a receives the second output signal S2 to indicate angles of rotation of the rotational exciter magnet 310a according to values of the second output signal S2 at different phases.

Figure 3B:
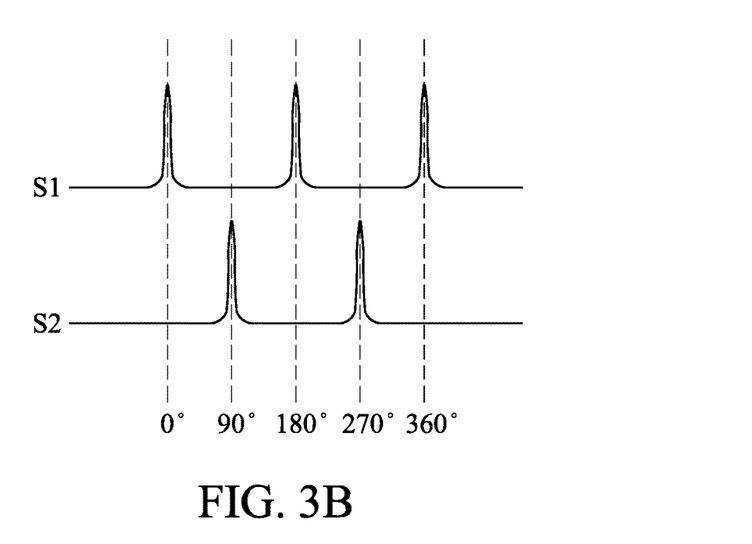
FIG. 3B shows a first output signal and a second output signal respectively generated by the piezoelectric transducer and a transducer in accordance with the third embodiment of the disclosure.

Referring to FIG. 3B, the rotational exciter magnet 310a rotates 180 or 360 degrees when the first output signal S1 is in high state and the second output signal S2 is in low state; otherwise, the rotational exciter magnet 310a rotates 90 or 270 degrees when the first output signal S1 is in low state and the second output signal S2 is in high state, thereby indicating angles of rotation of the rotational exciter magnet 310a.

In the third embodiment, the PZT and the TR which are perpendicular implemented with each other may also be used to indicate that rotational exciter magnet 310a rotates clockwise or counterclockwise. Referring to FIG. 3B, the second output signal S2 generated by the TR falls behind the first signal S1 generated by the PZT when the rotational exciter magnet 210a rotates counterclockwise; otherwise, the second output signal S2 generated by the TR leads the first signal S1 generated by the PZT when the rotational exciter magnet 210a rotates clockwise, thereby indicating the rotational exciter magnet 310a rotates clockwise or counterclockwise.

In the third embodiment, the TR is another piezoelectric transducer or a magnetic sensor. The magnetic sensor is a Hall-effect transducer, a magneto resistive-type sensor or a coil-type sensor.

Figure 4A:
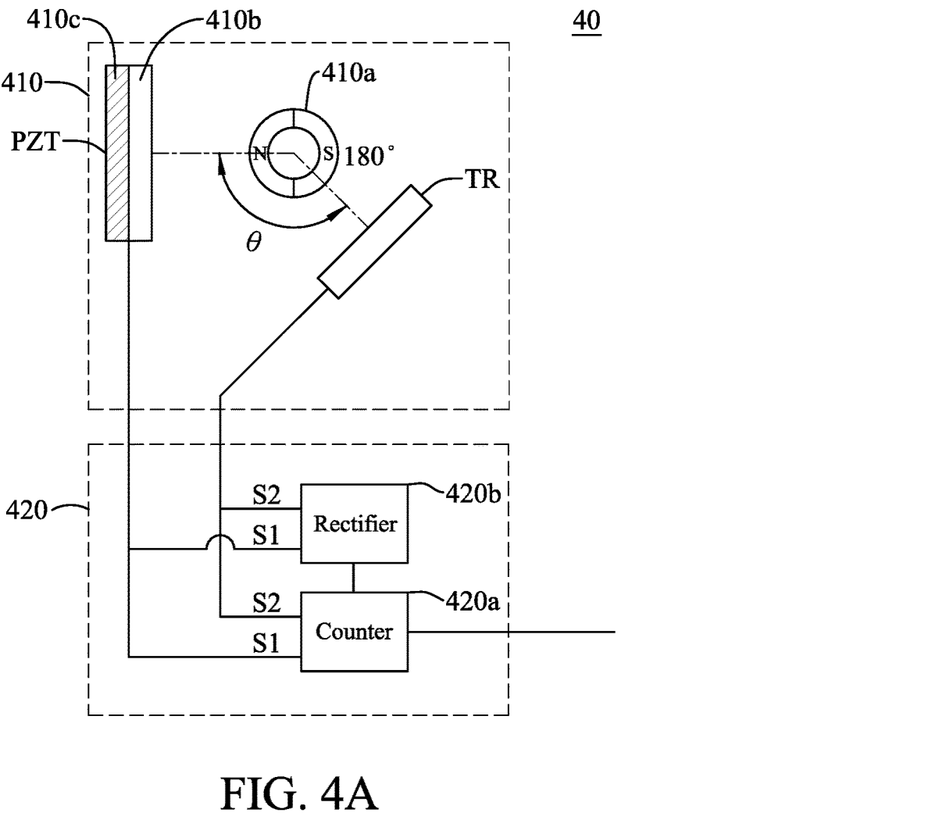
FIG. 4A is a schematic diagram of a batteryless rotary encoder in accordance with a fourth embodiment of the disclosure.

Referring to FIG. 4A, a batteryless rotary encoder 40 is provided in accordance with a fourth embodiment of the disclosure, in which the fourth embodiment differs from the first embodiment in that the rotation detecting section 410 further includes a transducer (TR). The TR is implemented at an angle θ to the PZT and generates a second output signal S2 and the angle θ is not equal to 180 degrees. The rotation detecting section 410 includes a rotational exciter magnet 410a, a PZT and the TR. The PZT is constructed by laminating a magnetic material 410b and a piezoelectric transduction sheet 410c. In signal processing section 420, the rectifier 420b receives the first output signal S1 and generates the power for the counter 420a.

Figure 4B:
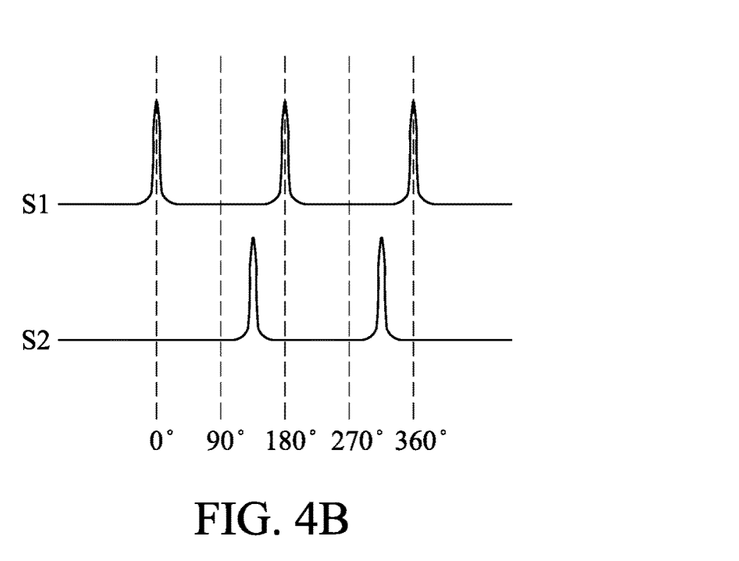
FIG. 4B shows a first output signal and a second output signal respectively generated by the piezoelectric transducer and a transducer in accordance with the fourth embodiment of the disclosure.

In the fourth embodiment, the PZT and the TR, which are at an angle θ with respect to each other, may also be used to indicate that rotational exciter magnet 410a rotates clockwise or counterclockwise. Referring to FIG. 4B, the second output signal S2 generated by the TR falls behind the first signal S1 generated by the PZT when the rotational exciter magnet 410a rotates counterclockwise; otherwise, the second output signal S2 generated by the TR leads the first signal S1 generated by the PZT when the rotational exciter magnet 410a rotates clockwise, thereby indicating the rotational exciter magnet 410a rotates clockwise or counterclockwise.

Figure 5A:
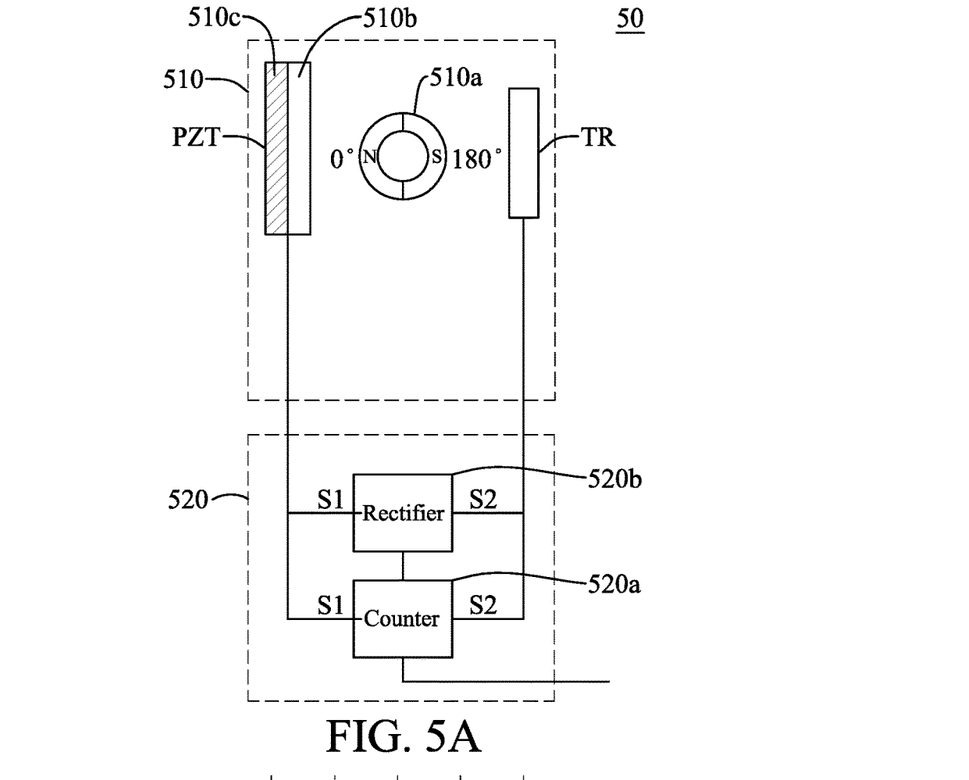
FIG. 5A is a schematic diagram of a batteryless rotary encoder in accordance with a fifth embodiment of the disclosure.

Referring to FIG. 5A, a batteryless rotary encoder 50 is provided in accordance with a fifth embodiment of the disclosure, in which the fifth embodiment differs from the first embodiment in that the rotation detecting section 510 further includes a transducer (TR). The TR is implemented on a side opposite to the PZT and generates a second output signal S2. The rotation detecting section 510 includes a rotational exciter magnet 510a, a PZT and the TR. The PZT is constructed by laminating a magnetic material 510b and a piezoelectric transduction sheet 510c. In signal processing section 520, the counter 520a receives a reserved phase signal $\overline{S2}$ of the second output signal S2 to indicate revolutions of the rotational exciter magnet 510a by subtracting the reserved phase signal from the first output signal S1.

Figure 5B:
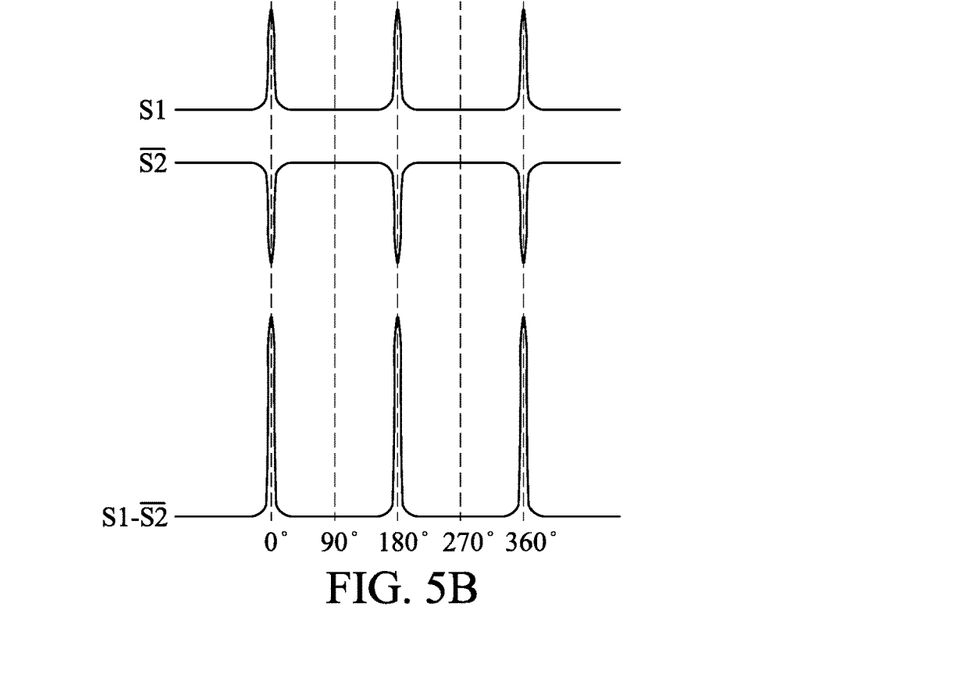
FIG. 5B shows a first output signal and a second output signal respectively generated by the piezoelectric transducer and a transducer in accordance with the fifth embodiment of the disclosure.

Referring to FIG. 5B, the rotational exciter magnet 510a rotates one turn when the counter 520a counts three pulses. The noise of the first output signal S1 and the noise of the inverted signal of the second output signal S2 may be assumed to be the same, and the output signal of the batteryless rotary encoder 50 with better S/N ratio may be obtained by subtracting a reserved phase signal $\overline{S2}$ of the second output signal S2 from the first output signal S1.

In the fifth embodiment, the TR is another piezoelectric transducer or a magnetic sensor. The magnetic sensor is a Hall-effect transducer, a magneto resistive-type sensor or a coil-type sensor.

Figure 6:
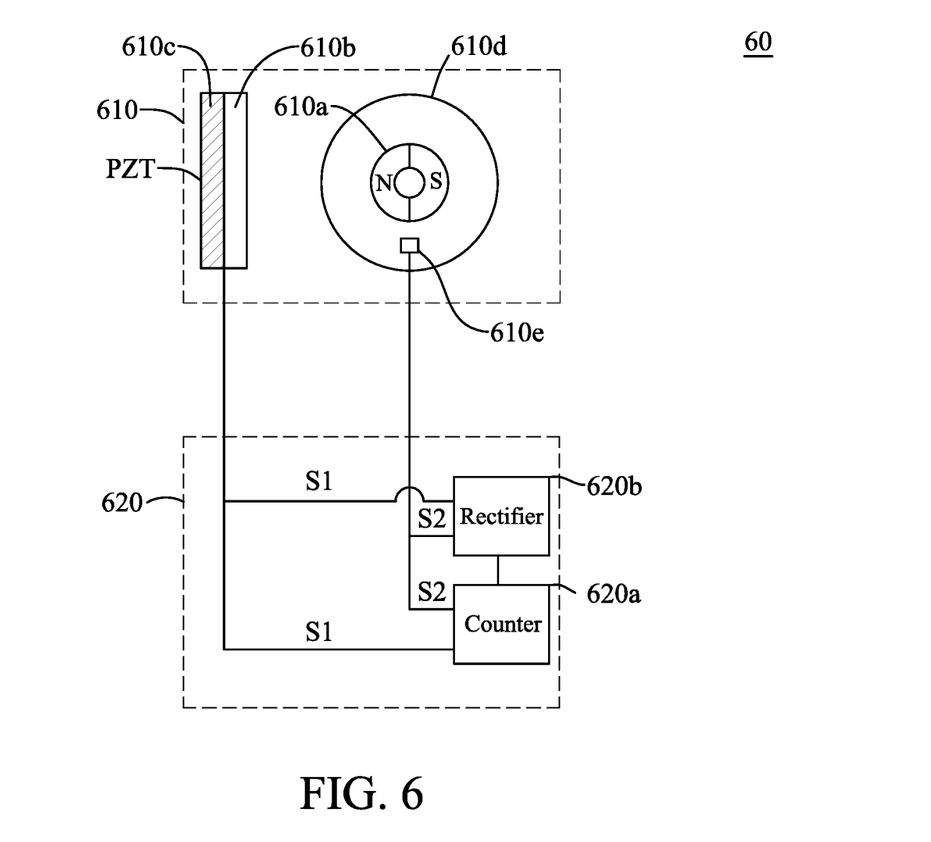
FIG. 6 is a schematic diagram of a batteryless rotary encoder in accordance with a sixth embodiment of the disclosure.

Referring to FIG. 6, a batteryless rotary encoder 60 is provided in accordance with a sixth embodiment of the disclosure, in which the sixth embodiment differs from the first embodiment in that the rotation detecting section 610 further includes an optical disk 610d and a photodetector 610e. The optical disk 610d is implemented on the same rotary shaft as the rotational exciter magnet 610a and rotates synchronously with the rotational exciter magnet 610a, the optical disk 610d has a light transmitting portion and an opaque portion (patterns).

The photodetector 610e generates a second output signal S2 according to the patterns on the optical disk 610d. In the sixth embodiment, the light detectors 610e are implemented at a position perpendicular to the PZT, but are not limited thereto. The counter 620a receives the second output signal S2 to assist precision angle measurements.

In the second, third, fourth and fifth embodiments, the rectifiers 220b, 320b, 420b and 520b are electrically connected between the TRs and the counters 220a, 320a, 420a, and 520a to receive the second output signal S2 and generates the power for the counters 220a, 320a, 420a, and 520a. In the sixth embodiment, the rectifiers 620b are electrically connected between the TR and the photodetector 610e to receive the second output signal S2 and generates the power for the counters 620a.

The magnetic material disclosed according to the embodiments of the disclosure is a magnet sheet or a magnetic metal sheet. The materials of the magnetic metal sheet includes iron (Fe), cobalt (Co), nickel (Ni), or combinations thereof.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A batteryless rotary encoder, comprising:
    a rotation detecting section, comprising:
    a rotational exciter magnet;
    a piezoelectric transducer, constructed by laminating a magnetic material and a piezoelectric transduction sheet, and the magnet material faces toward the rotational exciter magnet, wherein the rotational exciter magnet attracts or repels the magnet material so that the piezoelectric transducer is pressed or stretched by the magnet material to generate a first output signal when the rotational exciter magnet rotates; and
    a transducer, generating a second output signal; and
    a signal processing section, comprising;
    a counter, receiving the first output signal and calculating numbers of pulses of the first output signal to indicate revolutions of the rotational exciter magnet; and
    a rectifier, receiving the first output signal and generating the power for the counter,
    wherein the transducer is connected to the rectifier and the counter, the counter receives the second output signal to indicate a rotational status of the rotational exciter magnet according to the first output signal and the second output signal.

2. The batteryless rotary encoder as claimed in claim 1, wherein the transducer is a magnetic sensor.

3. The batteryless rotary encoder as claimed in claim 2, wherein the magnetic sensor is a Hall-effect transducer, a magneto resistive-type sensor or a coil-type sensor.

4. The batteryless rotary encoder as claimed in claim 1, wherein the transducer is implemented at an angle to the piezoelectric transducer, wherein the counter receives the second output signal to indicate the rotational exciter magnet rotates clockwise or counterclockwise according to order of occurrence of the first output signal and the second output signal and the angle is not equal to 180 degrees.

5. The batteryless rotary encoder as claimed in claim 4, wherein the transducer is implemented on a side the same with or perpendicular to the piezoelectric transducer.

6. The batteryless rotary encoder as claimed in claim 1, wherein the transducer is another piezoelectric transducer or a magnetic sensor.

7. The batteryless rotary encoder as claimed in claim 1, wherein the transducer is implemented on a side perpendicular to the piezoelectric transducer, wherein the counter receives the second output signal to indicate angles of rotation of the rotational exciter magnet according to values of the second output signal at different phases.

8. The batteryless rotary encoder as claimed in claim 1, wherein the transducer is implemented on a side opposite to the piezoelectric transducer, wherein the counter receives a reserved phase signal of the second output signal to indicate revolutions of the rotational exciter magnet by subtracting the reserved phase signal from the first output signal.

9. The batteryless rotary encoder as claimed in claim 1, wherein the rotation detecting section further comprising: an optical disk, implemented on the same rotary shaft as the rotational exciter magnet and rotates synchronously with the rotational exciter magnet, the optical disk having a light transmitting portion and an opaque portion; and a photodetector, generating a second output signal, wherein the counter receives the second output signal to assist precision angle measurements according to values of the second output signal.

10. The batteryless rotary encoder as claimed in claim 1, wherein the magnetic material is a magnetic metal sheet.

11. The batteryless rotary encoder as claimed in claim 10, wherein materials of the magnetic metal sheet comprise iron, cobalt, nickel, or combinations thereof.

12. The batteryless rotary encoder as claimed in claim 1, wherein the magnetic material is a magnet sheet.

* * * * *